(12) United States Patent
Zhang

(10) Patent No.: US 12,551,199 B2
(45) Date of Patent: Feb. 17, 2026

(54) FLUID COLLECTION DEVICE

(71) Applicant: AMERICAN MOLECULAR LABORATORIES INC., Vernon Hills, IL (US)

(72) Inventor: Hongjun Zhang, Buffalo Grove, IL (US)

(73) Assignee: American Molecular Laboratories Inc., Vernon Hills, IL (US)

( * ) Notice: Subject to any disclaimer, the term of this patent is extended or adjusted under 35 U.S.C. 154(b) by 863 days.

(21) Appl. No.: 17/746,392

(22) Filed: May 17, 2022

(65) Prior Publication Data

US 2022/0361856 A1    Nov. 17, 2022

Related U.S. Application Data

(60) Provisional application No. 63/189,474, filed on May 17, 2021.

(51) Int. Cl.
*A61B 10/00* (2006.01)

(52) U.S. Cl.
CPC .................. *A61B 10/0051* (2013.01)

(58) Field of Classification Search
CPC .................................. A61B 10/0051
See application file for complete search history.

(56) References Cited

U.S. PATENT DOCUMENTS

| | | |
|---|---|---|
| 2011/0212002 A1 | 9/2011 | Curry et al. |
| 2012/0046574 A1 | 2/2012 | Skakoon |
| 2013/0248045 A1* | 9/2013 | Williams ............... B01L 3/508 |
| | | 206/525 |
| 2017/0196542 A1 | 7/2017 | Spiteri |
| 2017/0246625 A1* | 8/2017 | Becker .............. A61B 10/0096 |

(Continued)

FOREIGN PATENT DOCUMENTS

| | | |
|---|---|---|
| CN | 106901781 A | 6/2017 |
| KR | 101800448 B1 | 11/2017 |

OTHER PUBLICATIONS

Translation of reference: Baek, KR 101800448 B1, Nov. 22, 2017, Noble Bio Co Ltd (Year: 2017).*

(Continued)

*Primary Examiner* — Eric F Winakur
*Assistant Examiner* — Sienna C Pyle
(74) *Attorney, Agent, or Firm* — Morgan, Lewis & Bockius LLP

(57) ABSTRACT

A fluid container including a container having a proximal end, a distal end, and an opening at the proximal end, a collecting chamber coupled to the proximal end of the container. The collecting chamber has a proximal end with an upper opening and a distal end with a lower opening, the upper opening having a diameter larger than a diameter of the lower opening. The fluid container further includes a cover with a base coupled to the proximal end of the collecting chamber and a stopper extending distally from a bottom of the base, the cover having an open position and a closed position. In the closed position, the cover seals the proximal end of the collecting chamber, and the stopper extends through the collecting chamber and in the open position, the cover exposes the upper opening, and the stopper is removed from the area proximate the lower opening.

18 Claims, 7 Drawing Sheets

(56) References Cited

U.S. PATENT DOCUMENTS

2018/0344568 A1    12/2018   Williams et al.
2019/0200966 A1*   7/2019   Zhan .................. B01L 3/502

OTHER PUBLICATIONS

International Search Report and Written Opinion for corresponding International Application No. PCT/US22/29603 dated Aug. 10, 2022, 8 pages.

* cited by examiner

FLUID COLLECTION DEVICE

CROSS-REFERENCE TO RELATED APPLICATIONS

This application claims the benefit of U.S. Provisional Patent Application No. 63/189,474 filed May 17, 2021, entitled "Fluid Collection Device", which is incorporated by reference herein in its entirety.

TECHNICAL FIELD

The present disclosure generally relates to a fluid collection device, and more particularly, a fluid collection device for receiving and holding bodily fluids, such as saliva.

SUMMARY

One embodiment of the present disclosure provides a fluid container including a container having a proximal end, a distal end, and an opening disposed at the proximal end, a collecting chamber removably coupled to the proximal end of the container, the collecting chamber including a proximal end having an upper opening and a distal end having a lower opening, the upper opening having a diameter larger than a diameter of the lower opening, and a cover having a base coupled to the proximal end of the collecting chamber, the cover having a stopper extending distally from a bottom of the base, the cover having an open position and a closed position. In the closed position, the cover seals the proximal end of the collecting chamber, and the stopper may extend from the base through the collecting chamber to an area proximate the lower opening to seal the container from the collecting chamber. In the open position, the cover exposes the upper opening of the collecting chamber, and the stopper may be removed from the area proximate the lower opening such that the upper opening of the collecting chamber is in fluid communication with the opening of the container.

In some embodiments, the lower opening of the collecting chamber includes an inner surface and an outer surface, the inner surface of the lower opening being removably coupled to an outer surface of the container.

In some embodiments, the cover includes a tab and a connector, the tab extending radially outwardly from an edge of the cover and the connector hingedly coupling the cover to the collecting chamber, the connector radially extending from the cover opposite the tab.

In some embodiments, a length of the stopper is less than or equal to a diameter of the upper opening. The stopper may have a length less than a length of the collecting chamber.

In some embodiments, a diameter of the stopper may be substantially the same as a diameter of the opening of the container. A diameter of the stopper may be less than the diameter of the lower opening.

In some embodiments, in the closed position the stopper extends from the bottom of the base of the cover to the opening of the container such that the stopper abuts the opening of the container. In the closed position, the stopper may extend from the bottom of the base to an area proximate the opening of the container. In the closed position, the stopper may extend from the bottom of the base through the lower opening of the collecting chamber.

In some embodiments, the cover is secured to the collecting chamber by friction fitting the cover over and within the upper opening. The cover may include a sidewall that is disposed around the upper opening when cover is in the closed position.

In some embodiments, in the open position the stopper is removed from the collecting chamber.

Another embodiment of the present disclosure provides a fluid container including a container being cylindrical in shape and having a proximal end, a distal end, and an opening disposed at the proximal end, a collecting chamber removably coupled to the proximal end of the container, the collecting chamber having a proximal end and a distal end, the proximal end having an upper opening and the distal end having a lower opening, the upper opening having a diameter larger than a diameter of the lower opening and a diameter of the opening of the container is less than the diameter of the lower opening of the collecting chamber, and a cover having a base hingedly coupled to the proximal end of the collecting chamber, the cover having a stopper extending distally from a bottom of the base towards the distal end of the collecting chamber, the stopper having a diameter substantially the same as a diameter of the opening of the container and the cover having an open position and a closed position. In the closed position, the stopper extends from the base to an area proximate the lower opening to seal the opening of the container from the collecting chamber. In the open position, the cover exposes the upper opening of the collecting chamber, and the stopper is removed from the area proximate the lower opening such that the collecting chamber is in fluid communication with the container and the upper opening is in fluid communication with the lower opening and the opening of the container.

Another embodiment of the present disclosure provides a fluid container including a container being cylindrical in shape and having a proximal end, a distal end, and an opening disposed at the proximal end, wherein the container includes a recess proximate the distal end and the distal end of the container includes a recessed portion and a bottom peripheral edge disposed on a plane, a collecting chamber removably coupled to the proximal end of the container and being frustoconical in shape, the collecting chamber having a proximal end and a distal end, the proximal end having an upper opening and the distal end having a lower opening, the upper opening having a diameter larger than a diameter of the lower opening, wherein a length of the collecting chamber is less than a length of the container and greater than the diameter of the upper opening, and a cover having a base hingedly coupled to the proximal end of the collecting chamber, the cover having a stopper extending distally from a bottom of the base towards the distal end of the collecting chamber, the stopper having a diameter substantially the same as the diameter of the opening of the container and the cover having an open position and a closed position. In the closed position, the cover is disposed within the upper opening and fully covers the upper opening, and the stopper extends from the base to an area proximate the lower opening to seal the opening of the container from the collecting chamber. In the open position, the cover remains coupled to the collecting chamber via a connector and exposes the upper opening of the collecting chamber, and the stopper is removed from the area proximate the lower opening such that the collecting chamber is in fluid communication with the container and the upper opening is in fluid communication with the lower opening and the opening of the container.

Another embodiment of the present disclosure provides a method for collecting fluid including herein in the closed position the cover seals the upper opening of the collecting chamber. In some embodiments, the cover includes a stopper that extends from the cover through the collecting chamber to an area proximate the lower opening of the collecting chamber to prevent backflow of the fluid from the container to the collecting chamber. In some embodiments, in the open position the cover exposes the collecting chamber and the stopper is removed from the area proximate the lower opening such that the collecting chamber is in fluid communication with the container and the upper opening is in fluid communication with the lower opening.

In some embodiments, the cover is hingedly coupled to the collecting chamber and removing the cover requires the use of only one hand.

In some embodiments, the method further includes decoupling the container from the collecting chamber when the cover is in the closed position and securing a cap to the container to prevent leakage of the fluid from the container.

BRIEF DESCRIPTION OF THE DRAWINGS

The following detailed description of embodiments of the fluid collection device, will be better understood when read in conjunction with the appended drawings of exemplary embodiments. It should be understood, however, that the disclosure is not limited to the precise arrangements and instrumentalities shown.

DETAILED DESCRIPTION

Figure 1:
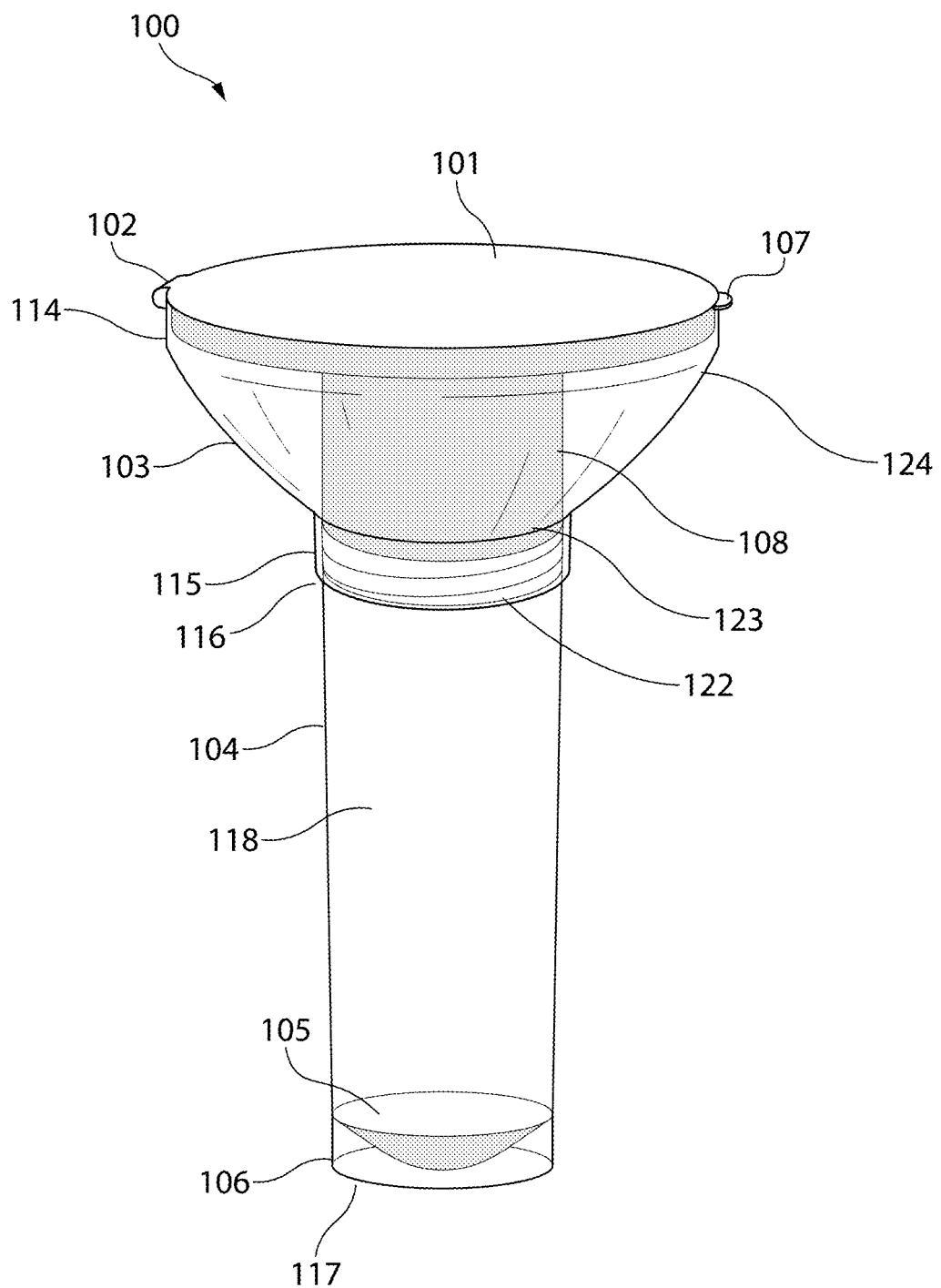
FIG. 1 is a front perspective view of a fluid collection device in accordance with an exemplary embodiment of the present disclosure.

Fluid collection devices for sampling of bodily fluids, such as saliva, have become more and more popular as an alternative method to other diagnostic methods, such as pharyngeal swabs. Collection of bodily fluids is important in the diagnosis of various diseases and infections, in addition to genetic testing or cancer screening. This has led to an increased demand for devices that can collect bodily fluids without the need of a medical professional. Current fluid collection devices, especially those for collecting saliva, use sponges for absorption of saliva, which is then squeezed into a holding chamber. These fluid collection devices also require complex assembly by the user or the use of both hands to ensure the bodily fluid being collected does not spill or leak.

Exemplary embodiments of the present disclosure provide a fluid collection device and methods of using the same. Refuting to FIGS. 1-7, there is shown a fluid collection device or fluid container, generally designated 100, and a method of using the same, generally designated 200. In use, fluid collection device 100 may be used to collect and hold bodily fluids (e.g., fluid 300). For example, fluid collection device 100 may be used to collect a saliva sample from a user and hold the saliva sample until it is ready to be tested or analyzed. In some embodiments, fluid collection device 100 is used to collect and hold saliva. However, fluid collection device 100 may be used to collect and hold other bodily fluids such as tears, sweat, mucus, or any other bodily fluid desired.

Fluid collection device 100 may allow a user to easily deposit samples of their bodily fluid into a container through a removable collecting chamber and seal their samples within the container of fluid collection device 100 to prevent leakage or inadvertent spillage. For example, fluid collection device 100 may allow a user to easily deposit saliva within fluid collection device 100 by opening a cover of fluid collection device 100 and spitting into a collecting chamber. The collecting chamber may be removably coupled to a narrower container such that the fluid flows from the collecting chamber to the container. The collecting chamber may be configured to widen the collection area for receiving fluids and allow the fluid to flow into the narrower container. Fluid collection device 100 may include a cover and may be easily sealed via the cover. The cover may be configured to seal both the collecting chamber and the container. For example, the collection chamber may be coupled to an opening of the container and the cover may be configured to seal both opening of the collecting chamber thereby sealing the opening of the container. The cover may prevent backflow of the fluid from the container into the collecting chamber and prevent spillage or leakage out of collecting chamber. The cover may also assist in sealing fluid collection device 100 and preventing leakage or spillage when the container is over filled and/or when some fluid remains in the collecting chamber.

Fluid collection device 100 may require no additional assembly by the user and may not require a user to add additional components to fluid collection device 100 during depositing, sealing, and transporting of their sample. The cover that seals fluid collection device 100 may be used and operated with a single hand. The user may seal fluid collection device 100 using a single hand and transport fluid collection device 100 to the desired destination without concern for leakage, spillage, or spoilage of their sample. In some embodiments, the container containing the sample may be decoupled from the rest of fluid collection device 100. The container may be decoupled and sealed using a cap, which allows an individual to analyze the sample without having to interact with the collecting chamber.

Referring to FIG. 1, fluid collection device 100 may include cover 101, collecting chamber 103, and container 104. Cover 101 may be coupled to collecting chamber 103, which may be coupled to container 104. In some embodiments, collecting chamber 103 is removably coupled to container 104. Collecting chamber 103 may be coupled to container 104 such that collecting chamber 103 is in fluid communication with container 104. For example, a user may deposit a bodily fluid, such as a sample of saliva, into collecting chamber 103 and the bodily fluid may flow from collecting chamber 103 into interior 118 of container 104. However, collecting chamber 103 may be fixedly coupled to container 104. In some embodiments, collecting chamber 103 is integral with container 104 such that collecting chamber 103 and container 104 form a unitary structure.

Cover 101, collecting chamber 103, and container 104 may be comprised of a polymer such as plastic. For example, cover 101, collecting chamber 103, and container 104 may be comprised of glass or a polymer such as polypropylene (PPE), polyethylene (PE), polyethylene terephthalate (PET), or combinations thereof. However, cover 101, collecting chamber 103, and container 104 may be comprised of other materials or combinations of materials. In some embodiments, cover 101 is comprised of a softer polymer than collecting chamber 103 and container 104. For example, cover 101 may be comprised of a softer polymer to allow cover 101 to be friction fit into collecting chamber 103. In some embodiments, collecting chamber 103 and/or container 104 are each comprised of a clear or transparent material, such as plastic or glass. Collecting chamber 103 and container 104 may be comprised of a non-transparent material, an opaque material, or a semi-transparent material.

In some embodiments, container 104 is comprised of a durable material (e.g., glass). For example, container 104 may be comprised of durable glass such that container 104 is does not crack or break during transportation of fluid collection device 100. Container 104 may be sized and shaped to hold a fluid (e.g., bodily fluid). For example, container 104 may be a cylinder configured to hold saliva, tears, sweat, mucus, or any other bodily fluid desired. However, container 104 may be a sphere, box, hemisphere, or another other shape desired. In practice, a user may deposit a sample of bodily fluid (e.g., saliva) into collecting chamber 103. The saliva may flow from collecting chamber 103 into interior 118 of container 104. Once the saliva has flowed into container 104, cover 101 may be used to seal collecting chamber 103 and since container 104 is coupled to collecting chamber 103, container 104 is also sealed off thereby preventing spillage, leakage, or spoilage of the collected bodily fluid.

Figure 2:
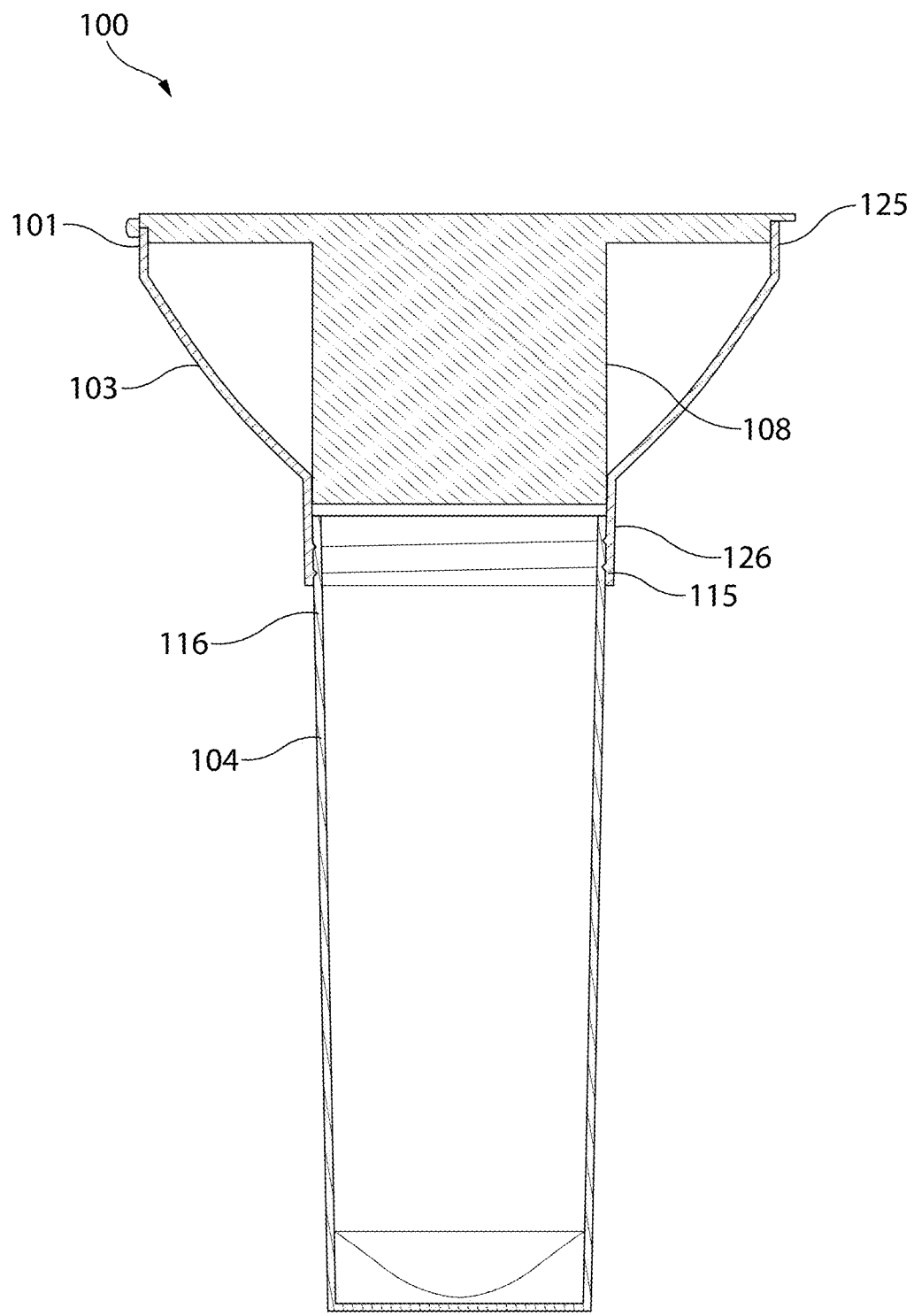
FIG. 2 is a zoomed in cross-sectional front view of the fluid collection device of FIG. 1.
Figure 3:
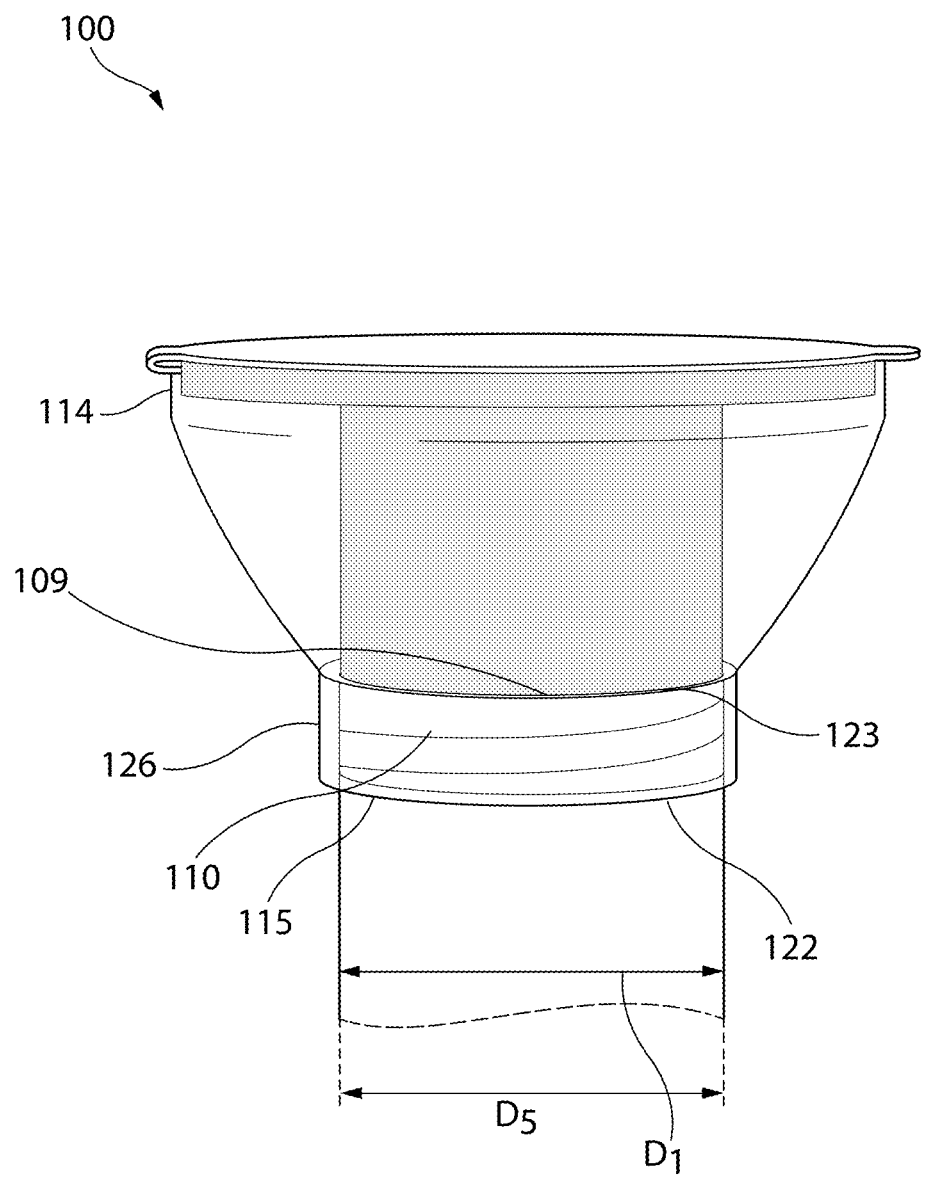
FIG. 3 is a zoomed-in front perspective view of the fluid collection device of FIG. 1 shown with the cover in the closed position.

Referring to FIGS. 1-3, fluid collection device 100 may include collecting chamber 103. Collecting chamber 103 may be used to widen the receiving area that receives the fluid sample, Collecting chamber 103 may be wider than container 104 to provide a larger area for the user to provide their fluid sample. For example, collecting chamber 103 may have a greater maximum diameter than the maximum diameter of container 104. Collecting chamber 103 may be sized and shaped to funnel the fluid sample into container 104. In some embodiments, collecting chamber 103 is substantially frustoconical in shape. However, collecting chamber 103 may be triangular, cylindrical, rectangular, trapezoidal or any other shape desired.

Collecting chamber 103 may include proximal end 114 and distal end 115, Proximal end 114 may include upper opening 124 and distal end 115 may include lower opening 122. In some embodiments, upper opening 124 is in fluid communication with lower opening 122. Collecting chamber 103 may taper from an area proximate proximal end 114 to an area proximate distal end 115. For example, a portion of collecting chamber 103 proximate proximal end 114 may have a larger diameter than a portion of collecting chamber 103 proximate distal end 115. In some embodiments, collecting chamber 103 has a consistent taper from an area proximate proximal end 114 to an area proximate distal end 115. However, collecting chamber 103 may have a variable taper from an area proximate proximal end 114 to an area proximate distal end 115. For example, collecting chamber 103 may have a greater degree of tapering proximate proximal end 114 or distal end 115. The tapering of collecting chamber 103 may allow for fluid to easily flow from proximal end 114 to distal end 115 and into interior 118 of container 104. In some embodiments, the tapering of collecting chamber 103 prevents buildup of fluid within collecting chamber 103. Collecting chamber 103 may having a maximum diameter that tapers from approximately 6.0 cm at proximal end 114 to approximately 1.5 cm at distal end 115. In some embodiments, collecting chamber 103 has a tapering angle of approximately 90° to approximately 30° between proximal end 114 and distal end 115.

In some embodiments, the entirety of collecting chamber 103 has a length of approximately 4.0 cm. However, collecting chamber 103 may have a length of approximately 1.0 cm to approximately 10.0 cm, approximately 2 cm to approximately 9 cm, approximately 3 cm to approximately 8 cm, or approximately 4 cm to approximately 7 cm. Collecting chamber 103 may have a maximum diameter defined by the diameter of upper opening 124, which may be approximately 3.5 cm. However, collecting chamber 103 may have a maximum diameter of approximately 1.5 cm to approximately 6.0 cm, approximately 2.5 cm to approximately 4.0 cm, or approximately 3.0 cm to approximately 4.0 cm. Upper opening 124 may have a diameter greater than lower opening 122. In some embodiments, lower opening 122 has a diameter of approximately 1.7 cm. However, lower opening 122 may have a diameter less than 1.7 cm or greater than 1.7 cm. In some embodiments, the overall maximum diameter of collecting chamber 103 varies from upper opening 124 to lower opening 122. For example, the overall maximum diameter of collecting chamber may be from approximately 1.0 cm to approximately 10.0 cm, approximately 0.5 cm to approximately 8.0 cm, approximately 1.5 cm to approximately 6.5 cm, approximately 4.0 cm to approximately 5.5 cm, or approximately 4.5 cm to approximately 5.0 cm.

In some embodiments, proximal end 114 and distal end 115 include portions that do not have a taper. For example, proximal end 114 may include proximal portion 125 and distal end 115 may include distal portion 126, each of which have a constant diameter. In some embodiments, proximal portion 125 has a constant diameter and may receive cover 101 and distal portion 126 has a constant diameter and may receive container 104. Proximal portion 125 may have a diameter greater than distal portion 126. Proximal portion 125 may have a length of approximately 0.5 cm, less than 0.5 cm, or greater than 0.5 cm and distal portion 126 may have a length of approximately 1.2 cm, less than 1.2 cm, or greater than 1.2 cm. In some embodiments, proximal portion 125 includes upper opening 124 and distal portion 126 includes lower opening 122.

Referring to FIG. 3, distal portion 126 may include inner surface 109 and outer surface 110. Inner surface 109 may include coupling features to allow for coupling of collecting chamber 103 to container 104. For example, inner surface 109 may include threads configured to mate with corresponding threads of container 104. However, inner surface 109 may include magnets, a locking mechanism, or any other type of coupling element configured to allow collecting chamber 103 to couple to container 104. Inner surface 109 may also include a protrusion which may be slidably received by a notch of container 104 to secure container 104 within distal portion 126. The coupling feature of inner surface 109 may allow for container 104 to be removably coupled to distal end 115 and lower opening 122 of collecting chamber 103. In some embodiments, inner surface 109 includes female threads for engaging with male threads disposed on container 104. For example, container 104 may be inserted through lower opening 122 into distal portion 126 and twisted to allow collecting chamber 103 to be coupled and secured to container 104. However, inner surface 109 may include male threads for engaging with female threads of container 104. In some embodiments, coupling of collecting chamber 103 to container 104 may form an airtight seal between coupling chamber 3 and container 104 to prevent foreign objects and debris from entering fluid collection device 100.

Inner surface 109 may include other coupling features such as an elastomeric gasket (e.g., O-ring) to allow for friction fitting container 104 into lower opening 122. In some embodiments, collecting chamber 103 and container 104 overlap along distal portion 126. For example, container 104 may be secured to collecting chamber 103 and overlap with distal portion 126 along the entire length of distal portion 126 (e.g., approximately 1.2 cm). In some embodiments, the elastomeric gasket may be disposed between collecting chamber 103 and container 104 to assist in keeping fluid collection device 100 airtight and preventing leakage of the fluid sample within container 104. For example, when container 104 is coupled to collecting chamber 103, the elastomeric gasket may assist in preventing leakage at the connection point between container 104 and collecting chamber 103. In some embodiments, the coupling between container 104 and collecting chamber 103 is airtight to prevent spilling or leakage.

Figure 6:
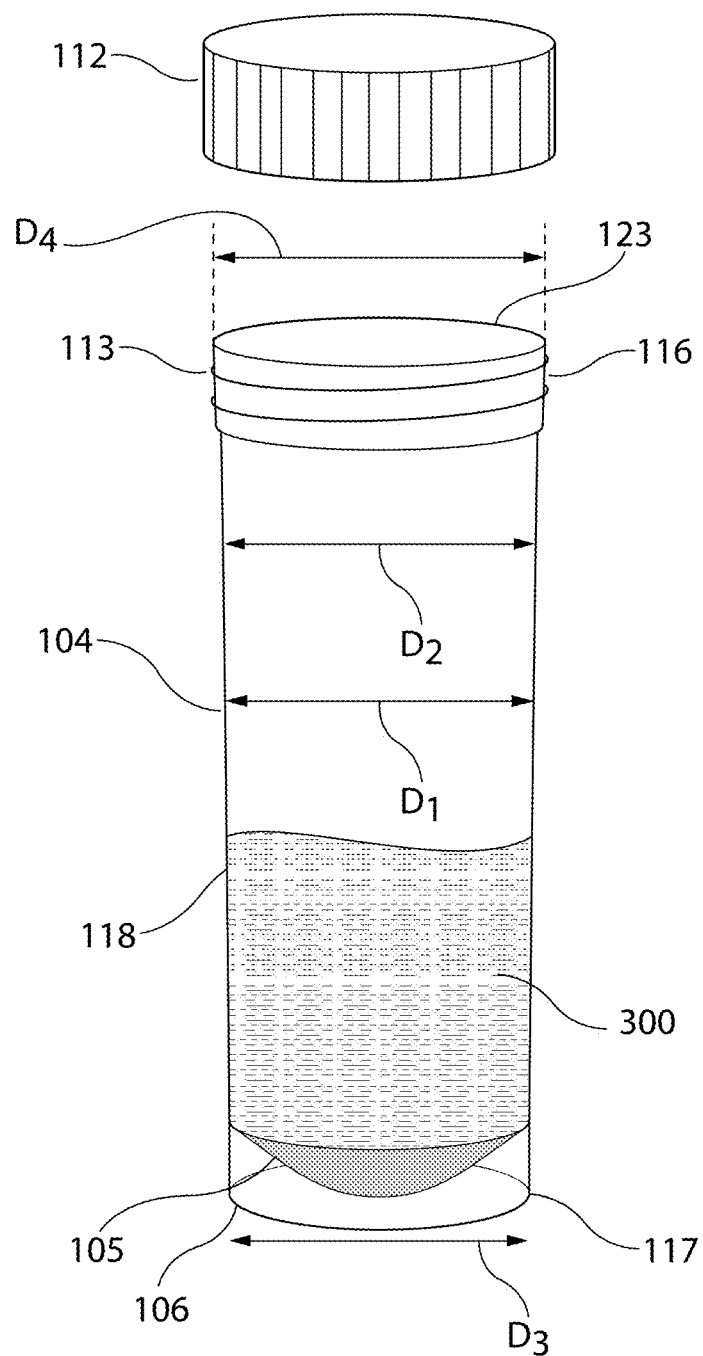
FIG. 6 is a front perspective view of the container of FIG. 1 detached from the collecting chamber and with a cap.

Referring to FIGS. 1 and 6, fluid collection device 100 may include container 104, which may be removably coupled to collecting chamber 103. Container 104 may be sized and shaped to receive and hold a fluid sample (e.g., bodily fluid). Container 104 may be cylindrical in shape and may have a length of approximately 10.0 cm. However, container 104 may have a length of approximately 3.0 cm to approximately 20.0 cm, approximately 5.0 cm to approximately 15.0 cm, approximately 5.0 cm to approximately 10.0 cm, approximately 8.0 cm to approximately 12.0 cm, or greater than 20.0 cm. Container 104 may vary in shape and size to hold any amount of fluid desired. For example, container 104 may be sized to hold approximately 2.0 mL to approximately 15.0 mL, approximately 5.0 mL to approximately 10.0 mL, greater than 15.0 mL or less than 2.0 mL of liquid. Container 104 may be sized and shaped based on the desired sample size of the fluid that is contained within interior 118 of container 104. Further, container 104 may be sized and shaped based on the desired method of testing and analysis performed on the sample within container 104. For example, container 104 may have a size and shape corresponding to the receiving area or portion of a testing device.

In some embodiments, container 104 has a length greater than the length of collecting chamber 103. Container 104 may include proximal end 116 and distal end 117. When container 104 is coupled to collecting chamber 103, proximal end 116 of container 104 may be inserted into distal end 115 of collecting chamber 103. In some embodiments, proximal end 116 of container 104 is received within distal portion 126 of collecting chamber 103. In one embodiment, distal end 115 of collecting chamber 103 is inserted into proximal end 116 of container 104 to secure container 104 to collecting chamber 103.

Container 104 may include opening 123 located at proximal end 116. When container 104 is coupled to collecting chamber 103, opening 123 and proximal end 116 of container 104 may be inserted into lower opening 122 of collecting chamber 103 and coupled to distal portion 126. Coupling of collecting chamber 103 to container 104 may result in opening 123 being in fluid communication with upper opening 124 and lower opening 122 of collecting chamber 103. In some embodiments, coupling container 104 to collecting chamber 103 results in a portion of container 104 being within collecting chamber 103. For example, coupling container 104 to collecting chamber 103 may results in opening 123 being disposed within distal portion 126 of collecting chamber 103, such that lower opening 122 is distal to opening 123 of container 104.

Figure 5:
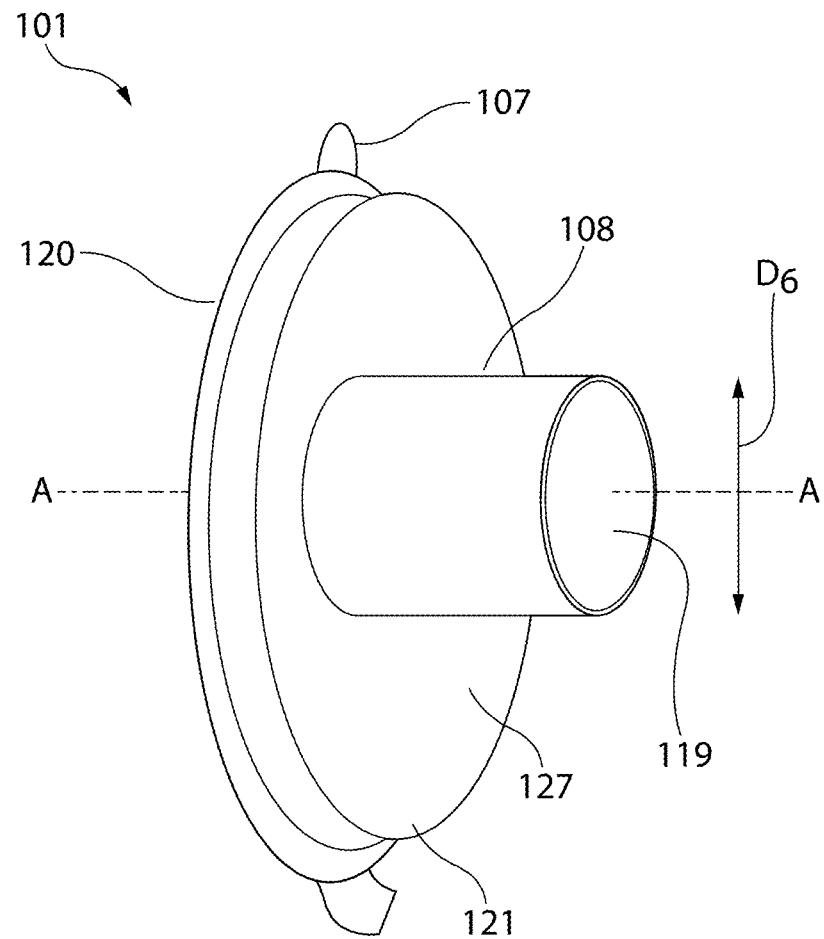
FIG. 5 is a front perspective view of a cover of the fluid collection device of FIG. 1.

Referring to FIGS. 3 and 5-6, container 104 may have outer diameter $D_1$ of approximately 1.7 cm. Outer diameter $D_1$ may be the maximum outer diameter of container 104. Outer diameter $D_1$ may be greater than 1.7 cm or less than 1.7 cm. For example, maximum outer diameter $D_1$ may be approximately 0.5 cm to approximately 5.0 cm, approximately 1.0 cm to approximately 3.0 cm, or approximately 1.5 cm to approximately 2.0 cm. Container 104 may also have inner diameter $D_2$ of approximately 1.4 cm. However, inner diameter $D_2$ of container 104 may be less than 1.4 cm or greater than 1.4 cm. For example, inner diameter $D_2$ may be approximately 0.5 cm to approximately 5.0 cm, approximately 1.0 cm to approximately 3.0 cm, or approximately 1.5 cm to approximately 2.0 cm. Inner diameter $D_2$ may be less than maximum outer diameter $D_1$. Container 104 may include distal outer diameter $D_3$. Distal outer diameter $D_3$ may be the outer diameter of container 104 proximate distal end 117. Distal outer diameter $D_3$ may be approximately 0.5 cm to approximately 5.0 cm, approximately 1.0 cm to approximately 3.0 cm, or approximately 1.5 cm to approximately 2.0 cm.

In some embodiments, container 104 tapers from proximal end 116 to distal end 117. For example, outer diameter D proximate proximal end 116 may be greater than distal outer diameter $D_3$ proximate distal end 117, which may be approximately 1.5 cm. Outer diameter $D_1$ and inner diameter $D_2$ of container 104 may vary based on the diameter of lower opening 122. For example, since container 104 is coupled to lower opening 122 of collecting chamber 103, as the diameter of lower opening 122 increases outer diameter $D_1$ and inner diameter $D_2$ of container 104 must also increase to correspond with the increase of the diameter of lower opening 122 to ensure an airtight fit between collecting chamber 103 and container 104 when they are coupled together.

Opening 123 of container 104 may be located at proximal end 116 of container 104. Opening 123 may expose interior 118 of container 104 and allow for container 104 to be in fluid communication with collecting chamber 103 when container 104 is coupled to collecting chamber 103. Container 104 may also include connecting portion 113 disposed at proximal end 116. Connecting portion 113 may be the portion of container 104 that is received by collecting chamber 103 when container 104 is coupled to collecting chamber 103. In some embodiments, connecting portion 113 includes opening 123. Opening 123 may have outer diameter $D_4$ and connecting portion 113 may have inner diameter $D_5$. Outer diameter $D_4$ of may be approximately 1.6 cm and inner diameter $D_5$ may be approximately 1.2 cm. However, outer diameter $D_4$ and inner diameter $D_5$ may be approximately 0.5 cm to approximately 3.0 cm, approximately 1.0 cm to approximately 2.5 cm, or approximately 1.5 cm to approximately 2.0 cm. In some embodiments, outer diameter $D_3$ of distal end 117 is greater than inner diameter $D_5$ of opening 123. Connecting portion 113 and opening 123 may include coupling features configured to engage with coupling features of collecting chamber 103. For example, connecting portion 113 and opening 123 may include male threads configured to engage with the female threads of collecting chamber 103 to securely couple container 104 to collecting chamber 103. The female threads may be disposed on an outer surface of connecting portion 113, with the inner surface of connecting portion 113 being devoid of threads to allow for a fluid to smoothly flow from collecting chamber 103 to container 104. In some embodiments, when collecting chamber 103 is coupled to container 104, a smooth pathway for fluid to flow is formed between collecting chamber 103 and container 104.

In some embodiments, container 104 includes inner bottom 105 disposed at or proximate distal end 117. Inner bottom 105 may be a recessed portion or concaved shaped and may be configured to hold the sample of saliva or other bodily fluid deposited within fluid collection device 100. In some embodiments, inner bottom 105 is approximately 1.0 cm of the total length of container 104. However, inner bottom 105 may be approximately 0.3 cm to approximately 3.0 cm, approximately 0.5 cm to approximately 2.5 cm, or approximately 1.0 cm to approximately 2.0 cm. Container 104 may also include bottom peripheral edge 106 disposed at distal end 117. Bottom peripheral edge 106 may be disposed on a plane so that container 104 may be stood upright on a surface. In some embodiments, the plane of bottom peripheral edge 106 may be parallel to opening 123 of container 104. Bottom peripheral edge 106 may surround the periphery of inner bottom 105. In some embodiments, bottom peripheral edge 106 extends from the periphery of inner bottom 105.

In some embodiments, opening 123 of container 104 is substantially parallel to lower opening 122 of collecting chamber 103 when collecting chamber 103 is coupled to container 104. Lower opening 122 may also be a parallel to upper opening 124 of collecting chamber 103 when collecting chamber 103 is coupled to container 104. In some embodiments, bottom peripheral edge 106 is substantially parallel to opening 123, lower opening 122, and upper opening 124 when collecting chamber 103 is coupled to container 104.

Referring to FIG. 6, container 104 may be coupled to cap 112 when container 104 is decoupled from collecting chamber 103. Cap 112 may include features configured to allow cap 112 to coupled to and be secured to container 104. Cap 112 may include female threads configured to engage with the male threads of connecting portion 113 of container 104. In some embodiments, cap 112 is coupled to container 104 at connecting portion 113 to cover opening 123 and prevent leakage, spillage, or spoilage of the fluid sample (e.g., fluid 300) disposed within container 104 when container 104 is decoupled from collecting chamber 103. Cap 112 may be configured to form an airtight seal within container 104. In some embodiments, cap 112 is coupled to container 104 when the sample of saliva or other bodily fluid (e.g., fluid 300) has already been deposited within container 104 and collecting chamber 103 is decoupled from container 104 and no longer needed.

Referring to FIGS. 1 and 3-5, fluid collection device 100 may include cover 101. Cover 101 may be coupled to collecting chamber 103 at proximal end 116 proximate upper opening 124. Cover 101 may include stopper 108 and base 121, and base 121 may include bottom 127 and top 120, In some embodiments, bottom 127 is substantially parallel to top 120. Cover 101 may include central axis A-A extending through cover 101, such as through the center of cover 101. In some embodiments, central axis A-A is substantially perpendicular to base 121. Central axis A-A may be substantially perpendicular to bottom 127 and top 120. In some embodiments, top 120 has a diameter greater than the diameter of bottom 127. For example, top 120 may cover a larger area than bottom 127.

When cover 101 is disposed within collecting chamber 103, base 121 may be abut proximal portion 125 of collecting chamber 103. For example, bottom 127 of base 121 may be coupled to proximal end 114 (e.g., upper opening 124) of collecting chamber 103 and top 120 may be disposed on top of upper opening 124 such that top 120 abuts upper opening 124. In some embodiments, cover 101 is configured to be placed within collecting chamber 103 such that bottom 127 is secured within proximal portion 125 at upper opening 124 and top 120 fully covers upper opening 124. For example, base 121 may be friction fitted within upper opening 124 to seal upper opening 124. In some embodiments, upper opening 124 and/or cover 101 may include an elastomeric gasket (e.g., O-ring) to assist with friction fitting cover 101 into upper opening 124. The elastomeric gasket may assist with preventing leakage from collecting chamber 103 when cover 101 is secured within upper opening 124. In practice, cover 101 may be used to seal fluid collection device 100 to prevent any spillage, leakage, or spoilage of the saliva sample deposited into fluid collection device 100. Due to collecting chamber 103 and container 104 being in fluid communication when collecting chamber 103 is coupled to container 104, sealing collecting chamber 103 with cover 101 results in sealing container 104 as well.

In some embodiments, cover 101 has an open position (FIG. 4) and closed position (FIGS. 1 and 3). In the closed position, cover 101 may be configured to seal upper opening 124 of collecting chamber 103. For example, bottom 127 of base 121 may be disposed within upper opening 124 and top 120 may full cover upper opening 124 such that collecting chamber 103 and thus fluid collection device 100 are sealed. Bottom 127 of base 121 may be friction fit into upper opening 124 to secure cover 101 to collecting chamber 103. In the closed position, cover 101 is configured to provide an airtight seal within collecting chamber 103 and container 104 when collecting chamber 103 is coupled to container 104. In some embodiments, when cover 101 is in the closed position, cover 101 seals both upper opening 124 of collecting chamber 103 and opening 123 of container 104. For example, cover 101 may seal both upper opening 124 and opening 123 when collecting chamber 103 is coupled to container 104 to prevent spillage or leakage of fluid from fluid collection device 100 when container 104 is over filled or when collecting chamber 103 has fluid that has not flowed into container 104. In the open position, base 121 of cover 101 may be removed from upper opening 124 thereby exposing upper opening 124 and collecting chamber 103. In some embodiments, when cover 101 is in the closed position, a plane along top 120 is substantially parallel to upper opening 124 of collecting chamber 103. When cover 101 is in the closed position, top 120 may be substantially parallel to bottom 127, upper opening 124, lower opening 122, opening 123 of container, and/or bottom peripheral edge 106. In some embodiments, when cover 101 is in the closed position, central axis A-A may be substantially perpendicular to top 120, bottom 127, upper opening 124, lower opening 122, opening 123 of container, and/or bottom peripheral edge 106.

Bottom 127 of base 121 may have a diameter of approximately 3.5 cm and thickness of approximately 0.5 cm. However, bottom 127 may have a diameter of approximately 2.0 cm to approximately 5.0 cm, approximately 2.5 cm to approximately 4.5 cm, or approximately 3.0 cm to approximately 4.0 cm and may have a thickness of approximately 0.1 cm to approximately 2.0 cm, approximately 0.5 cm to approximately 1.5 cm, or approximately 0.75 cm to approximately 1.0 cm. When cover 101 is coupled to collecting chamber 103, bottom 127 of base 121 may be disposed within upper opening 124 and top 120 may be configured to fully cover and seal the entirety of upper opening 124. Top 120 may have a diameter greater than the diameter of bottom 127. For example, top 120 may have a diameter of approximately 3.8 cm to approximately 6.3 cm. However, top 120 may have a diameter of approximately 1.0 cm to approximately 7.0 cm, approximately 1.5 cm to approximately 6.5 cm, or approximately 2.0 cm to approximately 5.0 cm. In some embodiments, top 120 has a larger diameter than the diameter of upper opening 124 and bottom 127 has a diameter less than or equal to upper opening 124. In some embodiments, bottom 127 has a diameter substantially equal to or slightly less than upper opening 124 to allow bottom 127 of base 121 to be friction fit within upper opening 124.

In some embodiments, cover 101 is coupled to proximal end 116 and/or proximal portion 125 of collecting chamber 103 via connector 102. For example, connector 102 may have one end coupled to an area proximate upper opening 124 and another end coupled to cover 101. Connector 102 allows cover 101 to be hingedly coupled to collecting chamber 103. Connector 102 may radially extend away from cover 101 and couple to an area of collecting chamber 103 proximate upper opening 124. For example, connector 102 may have a first end coupled to cover 101 and a second end coupled to collecting chamber 103 to couple cover 101 to collecting chamber 103. Connector 102 may allow cover 101 to be removed from upper opening 124 of collecting chamber 103 while still remaining coupled collecting chamber 103.

In some embodiments, connector 102 has a length that allows cover 101 to be pulled vertically out of upper opening 124 in the proximal direction and then pivoted away from upper opening 124. For example, connector 102 may have a length of approximately 0.1 cm to approximately 1.0 cm to allow cover 101 to be removed from collecting chamber 103 by vertically pulling cover 101 in the proximal direction and then allowing cover 101 to hinge about proximal end 114. Cover 101 may also include tab 107 extending radially outward from a peripheral edge of cover 101. In some embodiments, tab 107 is disposed opposite connector 102. In practice, a user may apply pressure to tab 107 in the proximal direction causing cover 101 to be removed from upper opening 124. In some embodiments, tab 107 and connector 102 allow a user to place cover 101 in the open and/or closed position using a single hand, such as the hand holding fluid collection device 100. Cover 101 may remain coupled to collecting chamber 103 even when removed from upper opening 124 due to connector 102.

Figure 4:
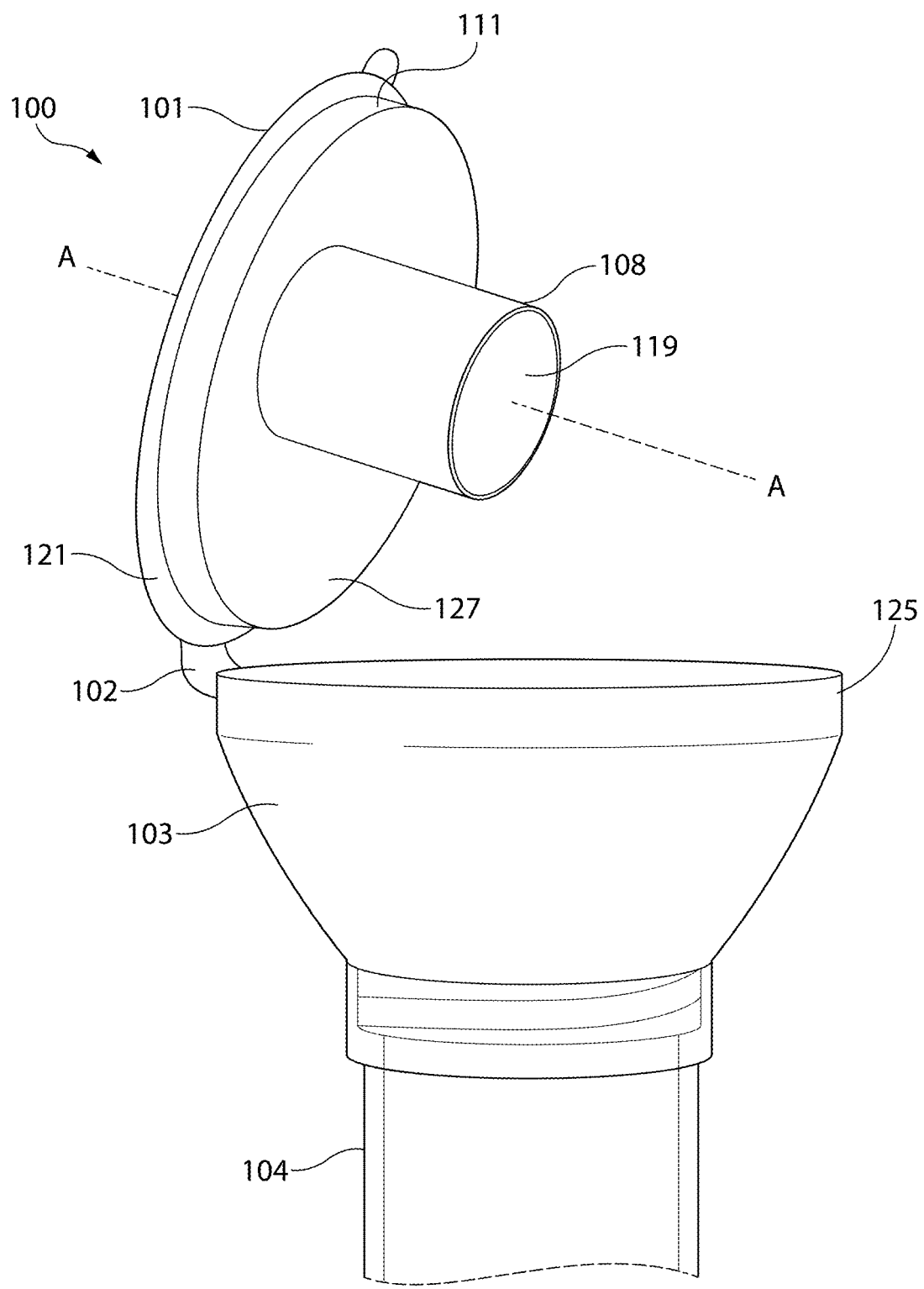
FIG. 4 is a zoomed-in front perspective view of the fluid collection device of FIG. 1 shown with the cover in the open position.

Referring to FIGS. 3-4, cover 101 may include sidewall 111. Sidewall 111 may extend from top 120 and may be configured to receive proximal end 114. Sidewall 111, top 120, and bottom 127 may form a groove within cover 101 that is configured to receive a portion of proximal end 114 (e.g., proximal portion 125). When cover 101 is in the closed position, sidewall 111 may be disposed around the exterior of upper opening 124 and proximal portion 125. Sidewall 111 may assist cover 101 in further securing cover 101 to collecting chamber 103 and allowing for an airtight seal within fluid collection device 100.

Referring to FIGS. 2 and 4-5, cover 101 may include stopper 108, which may extend longitudinally from base 121 of cover 101. Specifically, stopper 108 may extend from bottom 127 of base 121 and stopper 108 may include bottom 119. Stopper 108 may extend from bottom 127 along central axis A-A of cover 101. In some embodiments, stopper 108 is cylindrical in shape. However, stopper 108 may be triangular, pyramidal, rectangular, hexagonal, or any other shape desired. Stopper 108 may be comprised of a different material than base 121 of cover 101. For example, stopper 108 may be comprised of a softer material compared to base 121 to allow stopper 108 to be more flexible compared to base 121. In some embodiments, stopper 108 is comprised of two or more materials. For example, a portion of stopper 108 proximate bottom 127 of base 121 may be comprised of a rigid material and a portion of stopper 108 proximate bottom 119 may be comprised of a softer material, such as an elastomeric material. In some embodiments, a majority of stopper 108 is comprised of a rigid material and a portion proximate bottom 119 is comprised of a softer, elastomeric material.

Bottom 119 of stopper 108 may include diameter $D_6$. Diameter $D_6$ may be constant along the entire length of stopper 108 or may be variable such that stopper 108 tapers. In some embodiments, diameter $D_6$ is approximately 1.2 cm. However, diameter $D_6$ may be from approximately 0.5 cm to approximately 6.0 cm, approximately 1.0 cm to approximately 5.5 cm, or approximately 2.5 cm to approximately 4.5 cm. Diameter $D_6$ of stopper 108 may be less than the diameter of lower opening 122 to allow at least a portion of stopper 108 to be received within lower opening 122. Bottom 119 of stopper 108 may extend along a plane perpendicular to central axis A-A. In some embodiments, bottom 119 is parallel to lower opening 122 when cover 101 is in the closed position. In some embodiments, a length of stopper 108 is less than or equal to the diameter of upper opening 124. Stopper 108 may have a length less than a length of collecting chamber 103.

In some embodiments, when cover 101 is in the closed position and collecting chamber 103 is coupled to container 104, bottom 119 of stopper 108 abuts opening 123 of container 104 thereby preventing fluid from flowing from container 104 into collecting chamber 103. For example, stopper 108 may be positioned to prevent backflow of fluid from interior 118 of container 104 to collecting chamber 103. Bottom 119 and/or a portion of stopper 108 proximate bottom 119 may be comprised of a flexible material (e.g., elastomer) to allow bottom 119 to disposed adjacent to or within opening 123 of container 104. In some embodiments, the diameter of bottom 119 (e.g., diameter $D_6$) may be substantially the same as inner diameter $D_5$ of opening 123. However, stopper 108 may taper such that the diameter of bottom 119 is less than diameter $D_6$. In some embodiments, the diameter of bottom 119 is less than the diameter of a portion of stopper 108 proximate bottom 127 of base 121. The diameter of a portion of stopper 108 proximate bottom 119 may be less than a diameter of a portion of stopper 108 proximate bottom 119 of base 121. However, the diameter of a portion of stopper 108 proximate bottom 119 may be greater than a diameter of a portion of stopper 108 proximate bottom 119 of base 121.

Moving cover 101 to the open position (FIG. 4) may result in stopper 108 being removed from within collecting chamber 103. In the open position, base 121 and stopper 108 do not prevent upper opening 124 from being in fluid communication with lower opening 122, thereby exposing upper opening 124 and collecting chamber 103. Further, cover 101 being in the open position results in stopper 108 not preventing collecting chamber 103 from being in fluid communication with container 104. Cover 101 being in the open position also allows upper opening 124 to be in fluid communication with both lower opening 122 and opening 123 of container 104 when collecting chamber 103 is coupled to container 104, which results in collecting chamber 103 being in fluid communication with container 104. In practice, cover 101 must be in the open position for a user to deposit a sample (e.g., saliva) into fluid collection device 100. The user may then place cover 101 into the closed position to seal fluid collection device 100 using a single hand.

When cover is in the closed position (FIGS. 1 and 3), stopper 108 may extend from base 121 to an area proximate lower opening 122. For example, stopper 108 may extend distally from bottom 127 of base 121 to an area proximate lower opening 122. In some embodiments, stopper 108 is configured to seal off lower opening 122. In use, when container 104 is coupled to collecting chamber 103 and cover 101 is in the closed position, stopper 108 may seal off collecting chamber 103 from container 104 due to stopper 108 extending through collecting chamber 103 into opening 123 of container 104. For example, when cover 101 is in the closed position, stopper 108 may extend from base 121 to opening 123 of container 104 or may extend from base 121 to within opening 123 of container 104. Stopper 108 may be configured block fluid communication between collecting chamber 103 and container 104 by sealing off opening 123 of container 104 from collecting chamber 103. For example, stopper 108 may extend through distal portion 126 to lower opening 122 or an area proximate lower opening 122 to prevent any fluid from flowing from container 104 to collecting chamber 103.

Referring to FIGS. 1-2 and 4, stopper 108 may be configured to extend from base 121 to an area proximate lower opening 122 to prevent flow of fluid from container 104 to collecting chamber 103 when container 104 is coupled to collecting chamber 103. In some embodiments, stopper 108 extends from base 121 to distal portion 126. In this configuration, stopper 108 may not extend entirely through distal portion 126 and stopper 108 may terminate within distal portion 126 such that bottom 119 of stopper 108 is adjacent distal portion 126. In other embodiments, stopper 108 extends from base 121 through distal portion 126 to an area proximate lower opening 122. Stopper 108 may extend to an area proximate lower opening 122 such that bottom 119 of stopper 108 is proximate opening 123 of container 104, which is disposed within distal portion 126 when container 104 is coupled to collecting chamber 103. For example, stopper 108 may extend to an area proximate lower opening 122 and bottom 119 of stopper may be adjacent to opening 123 of container 104 when collecting chamber 103 is coupled to container 104. The diameter of bottom 119 of stopper 108 (e.g., diameter $D_6$) may be substantially the same size as diameter $D_4$ of opening 123 thereby allowing bottom 119 of stopper 108 to abut and seal opening 123 thereby preventing any fluid from entering or exiting container 104 when cover 101 is in the closed position and container 104 is coupled to collecting chamber 103. In other embodiments, stopper 108 extends through distal portion 126 to lower opening 122 such that such that a portion of stopper 108 extends through opening 123 and bottom 119 of stopper 108 is disposed within container 104. In some embodiments, approximately 0.3 cm of stopper 108 may extend into container 104. However, any amount of stopper 108 may extend into through opening 123 into container 104 such approximately 0.1 cm to approximately 2.0 cm, approximately 0.5 cm to approximately 1.5 cm, or approximately 0.8 cm to approximately 1.0 cm. Bottom 119 may be disposed within container 104 since when container 104 is coupled to collecting chamber 103, lower opening 122 of collecting chamber 103 is distal to opening 123 of container 104. In yet another embodiment, stopper 108 may extend through lower opening 122 and through opening 123 of container 104. Stopper 108 may extend through lower opening 122 resulting in bottom 119 being distal to lower opening 122 and being disposed within container 104.

Figure 7:
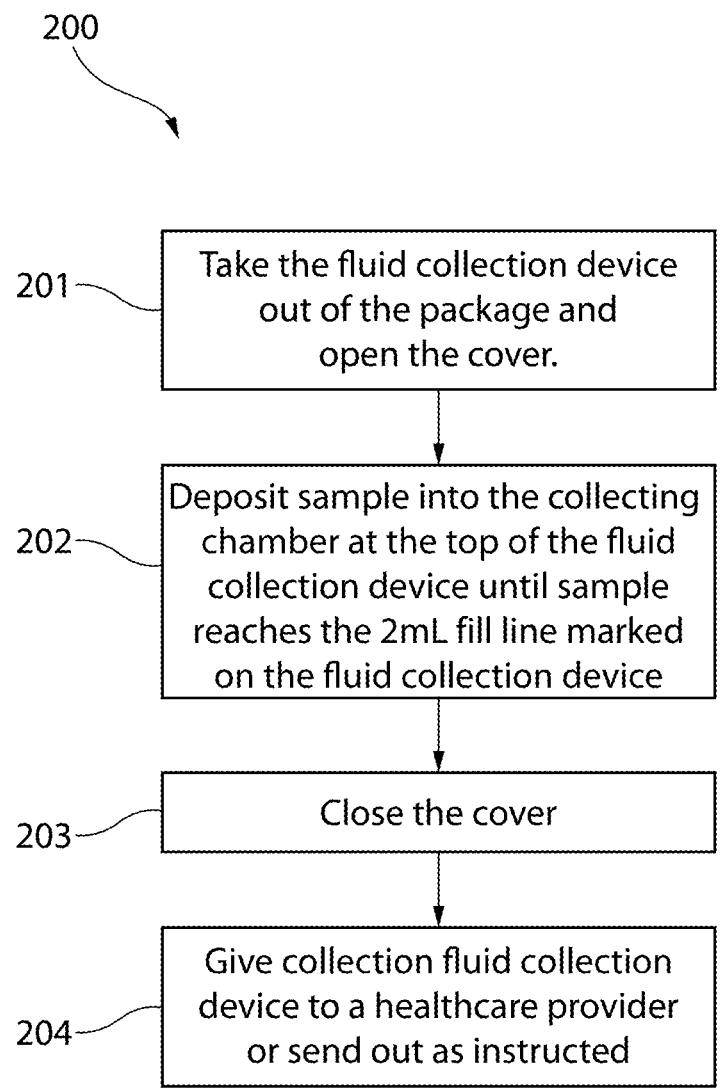
FIG. 7 is a flow diagram showing an exemplary method of using the fluid collection device of FIG. 1.

Referring to FIG. 7, a method of using fluid collection device 100 is shown. Step 201 of method 200 may include moving cover 101 from the closed position to the open position. In some embodiments, moving cover 101 from the closed position to the open position requires the user to apply pressure to tab 107. A user may move cover 101 from the closed position to the open position using only a single hand (e.g., the hand holding fluid collection device 100) by applying pressure to tab 107 in the proximal direction. Step 202 of method 200 may include the user depositing their fluid sample within collecting chamber 103 of fluid collection device 100. The user may deposit their sample (e.g., saliva or other bodily fluids) into collecting chamber 103 by spitting, injecting, pouring, or other means to deposit their sample into collecting chamber 103. Due to cover 101 being in the open position and collecting chamber 103 being coupled to container 104 forming an airtight seal and a fluid pathway, the sample may flow from collecting chamber 103 to container 104. The sample may be deposited through upper opening 124 and may flow through opening 123 of container 104 and lower opening 122 into interior 118 of container 104. The frustoconical shape and tapering of collecting chamber 103 assists the sample in flowing from upper opening 124 to interior 118 of container 104. Step 203 may include moving cover 101 from the open position to the closed position. For example, once the desired amount of sample has been collected within container 104, the user may move cover 101 from the open position to the closed position to prevent the sample from leaking or spilling out of container 104. Step 204 of method 200 may include transferring fluid collection device 100 to an authorized healthcare provider. For example, once cover 101 has been moved to the closed position to seal fluid collection device 100, the user may transport fluid collection device 100, such as via mail, to the desired location.

In some embodiments, method 200 includes decoupling container 104 from collecting chamber 103 when cover 101 is in the closed position. Method 200 may also include securing cap 112 to container 104, once container 104 has been decoupled from collecting chamber 103. In some embodiments, cover 101 may be moved from the closed position to the open position and back to the closed position using only a single hand, such as the hand holding fluid collection device 100. For example, using tab 107, a user may easily move cover 101 from the close position to the open position and then back to the closed position using the same hand that is holding fluid collection device 100.

It will be appreciated by those skilled in the art that changes could be made to the exemplary embodiments shown and described above without departing from the broad inventive concepts thereof. It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways.

Specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one". Finally, unless specifically set forth herein, a disclosed or claimed method should not be limited to the performance of their steps in the order written, and one skilled in the art can readily appreciate that the steps may be performed in any practical order.

What is claimed is:

1. A fluid container comprising:
   a container having a proximal end, a distal end, and an opening disposed at the proximal end;
   a collecting chamber removably coupled to the proximal end of the container, the collecting chamber including a proximal end having an upper opening and a distal end having a lower opening, the upper opening having a diameter larger than a diameter of the lower opening; and
   a cover having a base coupled to the proximal end of the collecting chamber, the cover having a stopper extending distally from a bottom of the base, the cover having an open position and a closed position,
   wherein in the closed position the cover seals the proximal end of the collecting chamber and the stopper extends from the base through the collecting chamber to an area proximate the lower opening and abutting the opening of the container to seal the container from the collecting chamber, and
   wherein in the open position the cover exposes the upper opening of the collecting chamber and the stopper is removed from the area proximate the lower opening such that the upper opening of the collecting chamber is in fluid communication with the opening of the container.

2. The fluid container of claim 1, wherein the lower opening of the collecting chamber includes an inner surface and an outer surface, the inner surface of the lower opening being removably coupled to an outer surface of the container.

3. The fluid container of claim 1, wherein the cover includes a tab and a connector, the tab extending radially outwardly from an edge of the cover and the connector hingedly coupling the cover to the collecting chamber, the connector radially extending from the cover opposite the tab.

4. The fluid container of claim 1, wherein a length of the stopper is less than or equal to a diameter of the upper opening.

5. The fluid container of claim 1, wherein in the closed position the stopper extends from the bottom of the base to an area proximate the opening of the container.

6. The fluid container of claim 1, wherein in the closed position the stopper extends from the bottom of the base through the lower opening of the collecting chamber.

7. The fluid container of claim 1, wherein a diameter of the stopper is substantially the same as a diameter of the opening of the container.

8. The fluid container of claim 1, wherein the stopper has a length less than a length of the collecting chamber.

9. The fluid container of claim 1, wherein a diameter of the stopper is less than the diameter of the lower opening.

10. The fluid container of claim 1, wherein in the closed position the cover is secured to the collecting chamber by friction fitting the cover over and within the upper opening.

11. The fluid container of claim 1, wherein in the open position the stopper is removed from the collecting chamber.

12. The fluid container of claim 1, wherein the cover includes a sidewall that is disposed around the upper opening when cover is in the closed position.

13. A fluid container comprising:
    a container being cylindrical in shape and having a proximal end, a distal end, and an opening disposed at the proximal end;
    a collecting chamber removably coupled to the proximal end of the container, the collecting chamber having a proximal end and a distal end, the proximal end having an upper opening and the distal end having a lower opening, the upper opening having a diameter larger than a diameter of the lower opening and a diameter of the opening of the container is less than the diameter of the lower opening of the collecting chamber; and
    a cover having a base hingedly coupled to the proximal end of the collecting chamber, the cover having a stopper extending distally from a bottom of the base towards the distal end of the collecting chamber, the stopper having a diameter substantially the same as a diameter of the opening of the container and the cover having an open position and a closed position,
    wherein in the closed position the stopper extends from the base and abuts the opening of the container to seal the opening of the container from the collecting chamber, and
    wherein in the open position the cover exposes the upper opening of the collecting chamber and the stopper is removed from the area proximate the lower opening such that the collecting chamber is in fluid communication with the container and the upper opening is in fluid communication with the lower opening and the opening of the container.

14. A fluid container comprising:
    a container being cylindrical in shape and having a proximal end, a distal end, and an opening disposed at the proximal end, wherein the container includes a recess proximate the distal end and the distal end of the container includes a recessed portion and a bottom peripheral edge disposed on a plane;
    a collecting chamber removably coupled to the proximal end of the container and being frustoconical in shape, the collecting chamber having a proximal end and a distal end, the proximal end having an upper opening and the distal end having a lower opening, the upper opening having a diameter larger than a diameter of the lower opening, wherein a length of the collecting chamber is less than a length of the container and greater than the diameter of the upper opening; and
    a cover having a base hingedly coupled to the proximal end of the collecting chamber, the cover having a stopper extending distally from a bottom of the base towards the distal end of the collecting chamber, the stopper having a diameter substantially the same as the diameter of the opening of the container and the cover having an open position and a closed position,
    wherein in the closed position:
       the cover is disposed within the upper opening and fully covers the upper opening, and
       the stopper extends from the base through the lower opening of the collecting chamber and abuts the opening of the container to seal the opening of the container from the collecting chamber, and
    wherein in the open position:
       the cover remains coupled to the collecting chamber via a connector and exposes the upper opening of the collecting chamber, and
       the stopper is removed from the area proximate the lower opening such that the collecting chamber is in fluid communication with the container and the upper opening is in fluid communication with the lower opening and the opening of the container.

15. A method for collecting fluid, the method comprising:
removing a cover from a fluid collection device to place the cover in an open position, the fluid collection device including a container removably coupled to a collecting chamber having an upper opening and a lower opening, the cover hingedly coupled to the collecting chamber;
depositing a fluid within the collecting chamber when the cover is in the open position such that the fluid travels from the collecting chamber through the lower opening and an opening of the container to within an interior of the container; and
placing the cover into a closed position, wherein in the closed position the cover seals the upper opening of the collecting chamber, wherein the cover includes a stopper that extends from the cover through the collecting chamber to an area proximate the lower opening and abuts the opening of the container, when the cover is placed into the closed position, to seal the container from the collecting chamber and prevent backflow of the fluid from the container to the collecting chamber.

16. The method of claim 15, wherein in the open position the cover exposes the collecting chamber and the stopper is removed from the area proximate the lower opening such that the collecting chamber is in fluid communication with the container and the upper opening is in fluid communication with the lower opening.

17. The method of claim 15, wherein the cover is hingedly coupled to the collecting chamber and removing the cover requires the use of only one hand.

18. The method of claim 15 further comprising:
decoupling the container from the collecting chamber when the cover is in the closed position; and
securing a cap to the container to prevent leakage of the fluid from the container.

* * * * *